United States Patent
Jamieson

(10) Patent No.: US 7,363,215 B1
(45) Date of Patent: Apr. 22, 2008

(54) PROCESS AND SYSTEM FOR UPDATING SEMANTIC KNOWLEDGE OVER A COMPUTER NETWORK

(76) Inventor: Patrick William Jamieson, 10172 Parkshire Dr., Noblesville, IN (US) 46060

( * ) Notice: Subject to any disclaimer, the term of this patent is extended or adjusted under 35 U.S.C. 154(b) by 741 days.

(21) Appl. No.: 10/923,412

(22) Filed: Aug. 20, 2004

Related U.S. Application Data

(60) Provisional application No. 60/502,881, filed on Sep. 12, 2003.

(51) Int. Cl.
*G06F 17/21* (2006.01)
*G06N 5/00* (2006.01)

(52) U.S. Cl. .............................. 704/10; 706/45; 706/50

(58) Field of Classification Search .................. 704/10; 706/50
See application file for complete search history.

(56) References Cited

U.S. PATENT DOCUMENTS

| | | | |
|---|---|---|---|
| 5,694,523 A | * | 12/1997 | Wical .......................... 706/45 |
| 5,909,667 A | * | 6/1999 | Leontiades et al. .......... 704/275 |
| 6,263,313 B1 | * | 7/2001 | Milsted et al. ................ 705/1 |
| 6,456,975 B1 | | 9/2002 | Chang |
| 6,513,027 B1 | * | 1/2003 | Powers et al. ................ 706/47 |
| 6,560,589 B1 | | 5/2003 | Steir et al. |

\* cited by examiner

*Primary Examiner*—David Hudspeth
*Assistant Examiner*—Justin W. Rider

(57) ABSTRACT

Updating a semantic knowledge base derived from sentences obtained from users during the process of creating their documents could improve the comprehensiveness of a semantic knowledge base, and permit the timely acquisition and dissemination of new knowledge. The present invention attains faster updating of semantic knowledge by transmitting unknown sentences collected from users, distributed over a computer network. The user inputs a sentence while creating a document in a particular knowledge domain. If a sentence is not part of the knowledge domain, it is transmitted over the network to the central knowledge source, where it is analyzed and the corresponding sentence and semantic proposition(s) added to the knowledge base as needed. The invention is able to disseminate the knowledge, i.e. propositions, which belong to the knowledge domain, to clients using either a "push" or "pull" methodology.

14 Claims, 3 Drawing Sheets

PROCESS AND SYSTEM FOR UPDATING SEMANTIC KNOWLEDGE OVER A COMPUTER NETWORK

CROSS REFERENCE TO RELATED APPLICATIONS

Referenced-Applications

This application claims the benefit of U.S. Provisional Application Ser. No. 60/502,881, filed on Sep. 12, 2003, titled "Method and System for Updating Semantic Knowledge over a Computer Network", which is incorporated by reference herein in its entirety. This application references application Ser. No. 10/844,912 titled, "Process for constructing a semantic knowledge base using a document corpus", filed on May 13, 2004, also incorporated by reference.

BACKGROUND OF INVENTION

1. Field

The present invention relates to a method and system for capturing semantic knowledge in a knowledge domain, and more specifically, to updating a semantic knowledge base derived in part from documents created by multiple users distributed over a computer network.

2. Background

Semantic knowledge deals not only with the meaning of words, but how these meanings combine in sentences to form concepts that can be described with simple propositions. Creating semantic knowledge base(s) can be valuable for variety of computer based applications. Such applications include billing, decision support, data mining, and speech recognition. In medicine, for example, a semantic knowledge base could provide a means to code reports stored in electronic medical records. After the medical reports were coded, researchers could then determine the prevalence of pulmonary infiltrate in patients with chest x-rays or the frequency of patients needing feeding tubes for serious burn injuries.

While the value of a semantic knowledge base is well recognized, constructing a good knowledge base which adequately represents the knowledge in a specific knowledge domain is a daunting task. In Ser. No. 10/844,912 titled, "Process for constructing a semantic knowledge base using a document corpus", methods were described to build a semantic knowledge base over a knowledge domain using a document corpus. A corpus is a large number of related documents, typically over 100,000. Propositions can be created that represent the semantic knowledge contained in sentences in these documents as described in Ser. No. 10/844,912. Propositions are distinct from the sentences that convey them, although they are related. For example, the sentences "The chest x-ray is normal" and "The chest x-ray is within normal limits" map to the same proposition or meaning. The advantage of analyzing a corpus using the tools described in (Ser. No. 10/844,912) is that important semantic concepts will not be overlooked. Also different linguistic expressions containing the same underlying meaning will be represented in a consistent manner.

Unfortunately, new knowledge is constantly being created that will not be reflected in a backward looking document corpus. Although in theory one could collect additional documents for semantic analysis, this process can be time-consuming, expensive, and not responsive to rapidly changing knowledge. What is needed is a method to continuously collect new sentences in a specific knowledge domain, characterize the semantic knowledge, and update both the knowledge source and its clients.

In Stier (U.S. Pat. No. 6,560,589) a method for maintaining a knowledge base system was described where authors created knowledge objects, and analysts entered knowledge into the knowledge base. The role of the analysts was to provide authors feedback, review content for technical accuracy, and adherence to conventions and guidelines. The method recognizes the contribution of multiple sources of knowledge, but gives authors and not analysts the primary role in knowledge creation. Stier's method does not specifically focus on the semantic knowledge contained within documents.

Chang (U.S. Pat. No. 6,456,975) described a method to update a speech recognition system for out of vocabulary words or pronunciations. The computer system transmits unrecognized data from a speech recognition program from the particular client to a provider. While this method is useful for this particular application, it does not describe how to update a semantic knowledge base in a particular knowledge domain. The method does not address, for example, how a correctly recognized sentence by the speech recognition program, but not part of the semantic knowledge base, for a particular knowledge domain could be used to increase the size and quality of the knowledge base. Sentences with uncharacterized semantics need to be sent to a knowledge engineer for analysis and possible inclusion in the knowledge base. Since new knowledge could be created by any user, there is a need for methods to quickly capture, transmit, analyze, and distribute this knowledge in a convenient fashion.

OBJECTS AND ADVANTAGES

The failings of the prior art are overcome by the present invention which has as its objectives the following:

An object of this invention is a method for signaling to a user that a domain sentence is not in the semantic knowledge base.

Another object of this invention is a method for transmitting over a computer network a domain sentence not in the knowledge base to a knowledge engineer for semantic analysis.

Another object of this invention is a method for transmitting over a computer network updated semantic knowledge to one or more users of the knowledge base.

SUMMARY OF INVENTION

The present invention relates to a semantic knowledge base and a process for continuously updating the knowledge derived from sentences produced when creating documents in a particular knowledge domain. A written or spoken sentence is compared to other sentences in the knowledge domain stored on the client computer or in a centralized repository. Proposition(s) that represent the semantic knowledge in the sentence are retrieved from the semantic knowledge base. If there are no corresponding semantic propositions for the sentence it is marked as unknown semantic meaning, and a visual indication, such as a red color, is associated with the words in the sentence, and displayed on the user interface. The system then transmits this sentence over a computer network, either upon user command or at a specified time interval depending on the user's preference. Knowledge engineers receive this sentence from a queue and employ knowledge editing tools to create new entries in the semantic knowledge base when appropriate. Finally, the updated entries are transmitted to all clients either upon demand or at a specific time interval depending on the user's preference.

BRIEF DESCRIPTION OF DRAWINGS

These and other features of the Subject Invention will be better understood in relation to the Detailed Description taken in conjunction with the Drawings, of which.

Understanding that these drawings depict only typical embodiments of the invention and are not to be construed to limit its scope, the invention will be described in detail below.

DETAILED DESCRIPTION

The present invention employs several knowledge base components described in application Ser. No. 10/844,912 titled, "Process for constructing a semantic knowledge base using a document corpus, herein referred to as "corpus based knowledge construction". Briefly, that invention describes the steps for mapping the set S of sentences in a corpus of related documents, to the set M, of unique meanings or propositions in a knowledge domain to form a knowledge base. A knowledge domain is the semantic knowledge contained in a large corpus of related documents from the domain, for example the semantic knowledge in 500,000 radiology reports. The fundamental unit asserted in the semantic knowledge base is a proposition expressed as a declarative sentence, conveying the underlying meaning of a document sentence.

Propositions are distinct from the sentences that convey them, although they are related. For example, the sentences "The chest x-ray is normal" and "The chest x-ray is within normal limits" map to the same proposition or meaning. The knowledge-base designer creates propositions in a semi-automated fashion by drawing from common sentences in the corpus using software tools. By mapping sentence variants to the same proposition, the equivalence of different free-text sentences is accurate because strong methods of string matching are used, over weaker statistical methods. Propositions and sentence mapping are systematically performed to fully characterize the semantic knowledge of a domain. Sentences are defined more broadly to be either complete, or fragments such as phrases that are not contained within another sentence. The current invention uses the semantic knowledge base, and a table that associates free-text sentences with their underlying propositions from this earlier work.

Figure 1:
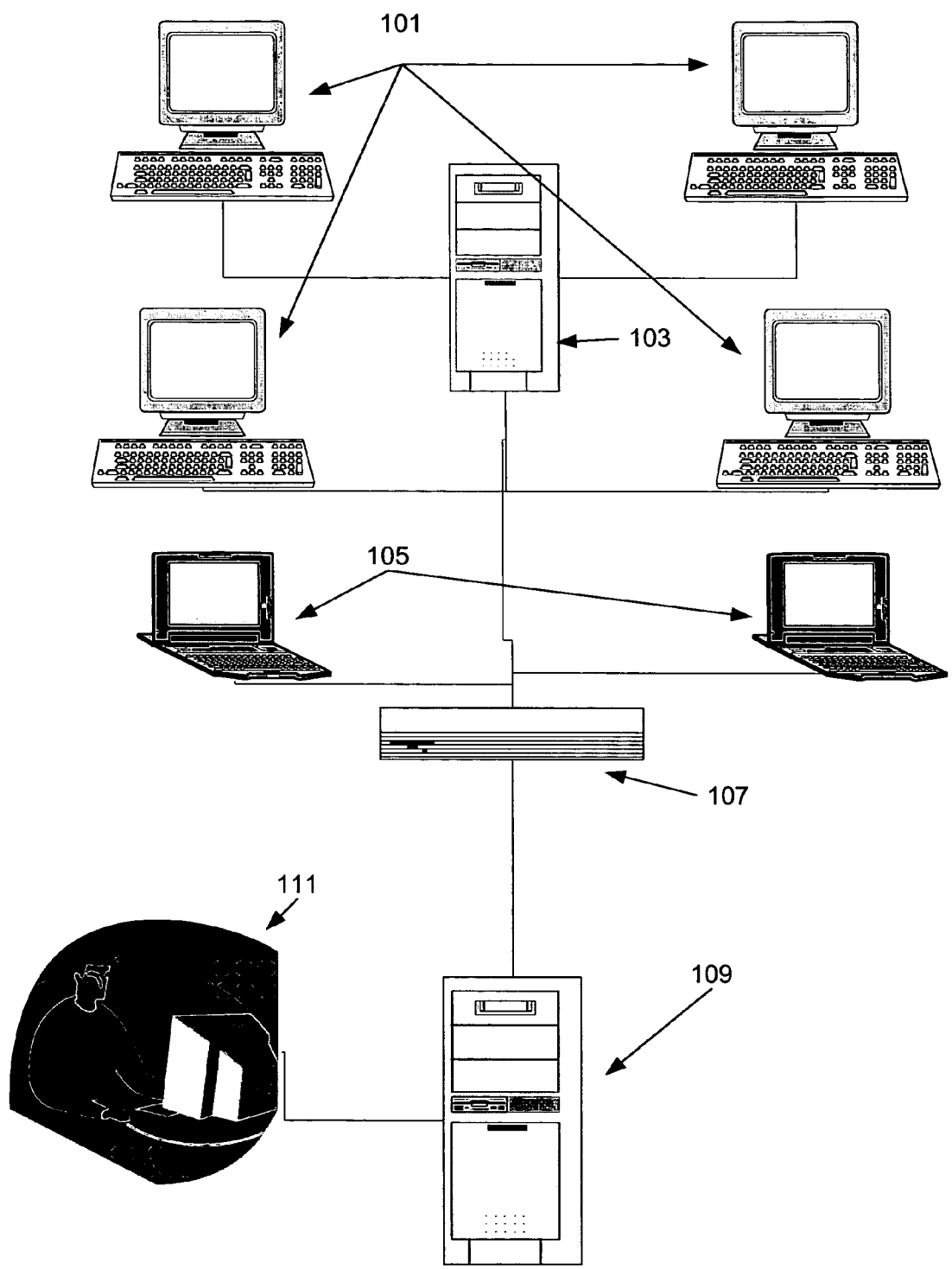
FIG. 1 is a diagram showing the components of the system on which the present invention can be practiced.

FIG. 1 shows the components of the system for transmitting new sentences and semantically processing them. Written or spoken input is first processed by client computers (101, 105). These computer systems include desktop personal computers (PC), tablet PCs, laptops, or any general microprocessor-based computer system. The present invention may also be practiced in a distributed computing environment where processing is done on a central server (103). The computer(s) may be linked in a local area network such that the sentence and semantic knowledge-base are stored on one or more servers. Client machines may be resident on the network or connect to it intermittently using a network or wireless adapter. A router (107) is used to send sentence data from the local area network to the source computer(s) for where the semantic knowledge base is maintained (109). A knowledge engineer (111) updates the knowledge-base as new sentences are received using semi-automated tools described in corpus based knowledge construction. The client computer(s) and source computer(s) may be resident on the same local network or may be in entirely different locations linked through a wide area network (WAN) such as the internet. Those skilled in the art understand there are many ways to create such computer network(s) capable of transmitting data from one machine to another, and the topology indicated in FIG. 1 is not to be taken in a limiting sense, but merely one embodiment of the present invention.

Figure 2:
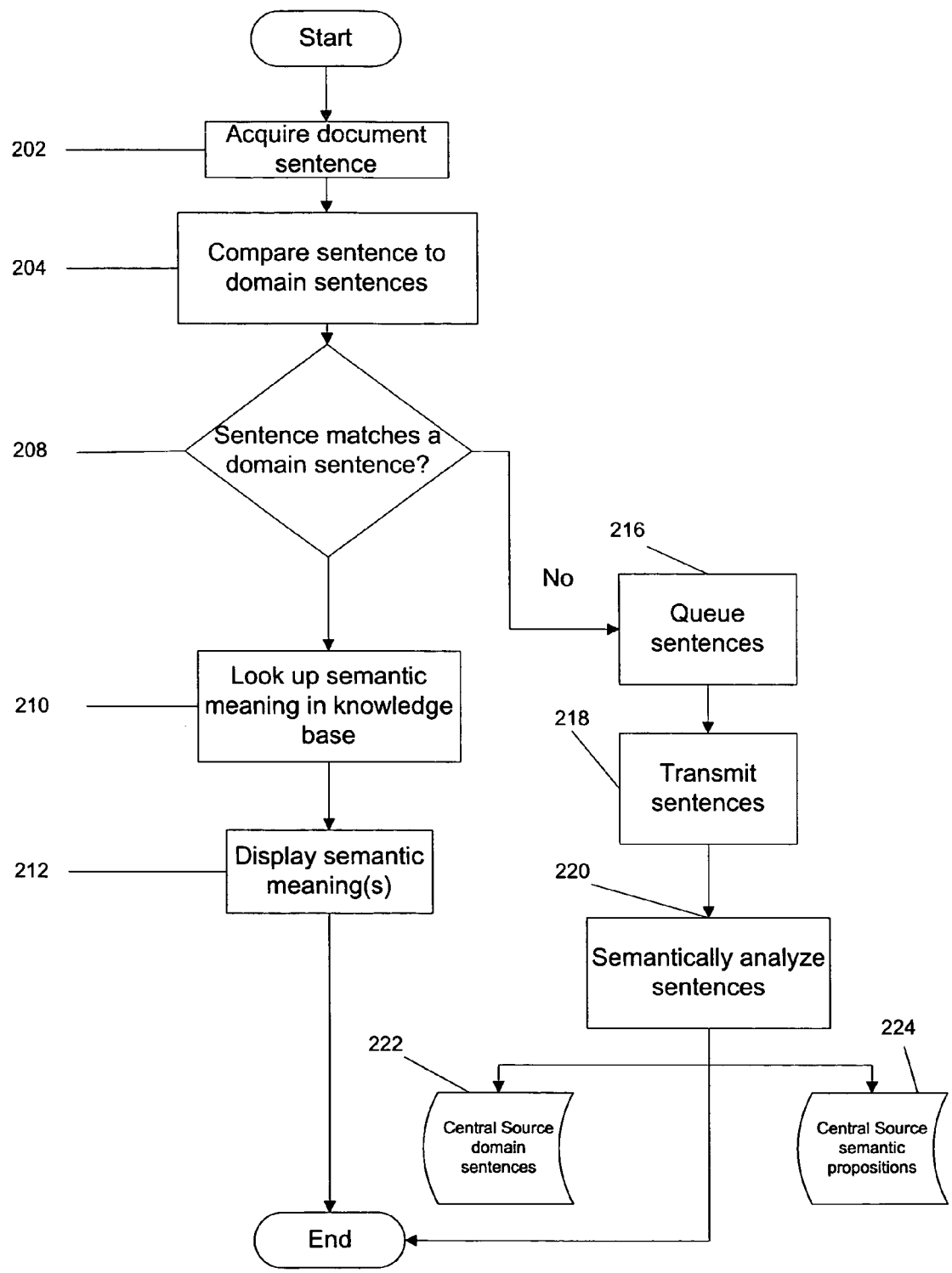
FIG. 2 is a flowchart of the method for the distributed updating of the central semantic knowledge base according to an embodiment of the invention.

FIG. 2 shows, in flow chart form, the steps which are carried out in the embodiment described in connection with FIG. 1. In step (202) users input sentences into documents using a word processor, speech recognition program, or any of a number of application programs running on a client machine (101, 105), which allow for the input of a sentence. The sentence is compared to a database of domain sentences (204) stored on any of the client machine (101, 105), local server (103), or central source (109). The domain sentences are derived from analyzing hundreds of thousands of documents in the knowledge domain of interest. As described in corpus based knowledge construction, a unique sentence table is constructed from a corpus of related documents. A knowledge-base engineer methodically analyzes and constructs a knowledge base of propositions, which represent the semantic meaning of these sentences. Each sentence in the domain is mapped to proposition(s) or placed in a queue awaiting semantic analysis.

If the user sentence is found in the database of domain sentences, the semantic meaning is retrieved from the semantic knowledge base (210), stored on any of the client machine (101, 105), local server (103), or central source (109). Additionally, a visual indication may also be given indicating the sentence is recognized in a specific knowledge domain. Optionally, the semantic proposition(s) can be returned to the user (212).

If the sentence is not in the database of domain sentences or its semantic uncharacterized it is marked as semantically unknown, and optionally displayed using different fonts/weights including color, type, point size, bold, italics, underline, capitalization, flashing, or any combination of these features. The sentence is placed in a message queue (216) consisting of a specialized cache either in computer memory or on a disk drive on either the client computer (101, 105) or local server (103). Such message queues are well known to those involved in the art of computer programming and networking. The sentences are transmitted over the computer network (218) and placed into a receiving queue on a computer containing the central source knowledge base (109). Alternately, the receiving queue may be on a separate computer of the organization that maintains the knowledge base. The knowledge engineer receives the sentences from the queue and using the software tools and methods, described in corpus based knowledge construction, determines if new entries to the semantic knowledge base are required. If new proposition(s) are needed to reflect the underlying semantic knowledge in the sentence, they are created and placed in the central semantic knowledge base (224). The new sentence and corresponding mappings to its proposition(s) are also added (222).

Figure 3:
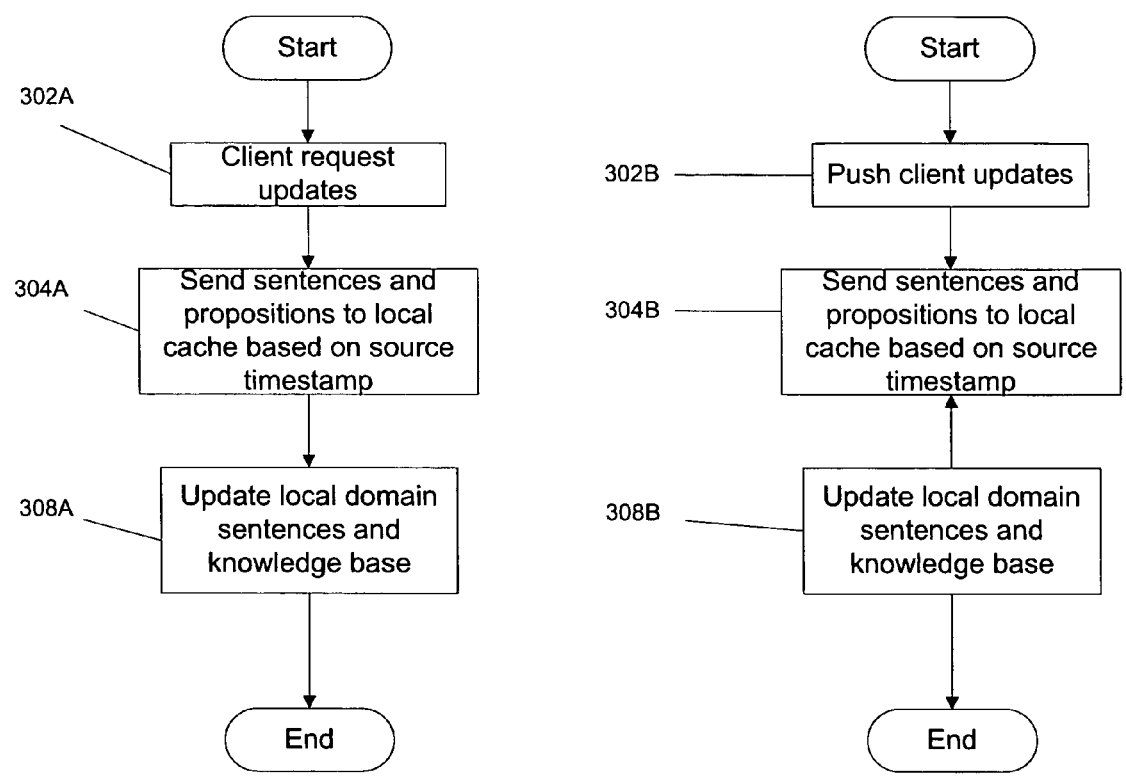
FIG. 3 is a flowchart of the method for the distributed updating of client systems that use the semantic knowledge base according to an embodiment of the invention.

In FIG. 3 a flow chart shows the step for updating client computer(s) and local server(s). If a request (302A) is received from a client machine, its local knowledge base and domain sentences are compared to the knowledge base and domain sentences on the server using a timestamp or other method of comparison know to persons in the art of database design and replication. Those new sentences and propositions are sent to a local cache over the network to the receiving machine(s) (304A). The local domain sentences and semantic knowledge base are then updated (308A). Alternately, the knowledge source could maintain a list of clients and on a specified schedule push sentences and propositions (302B) to the client machines over the network. The updating of sentences and proposition(s) require the receiving machines (306B) to compare these incoming sentences to their local store prior to updating (308B) to ensure the most up to domain sentences and semantic knowledge base.

DESCRIPTION AND OPERATION OF ALTERNATIVE EMBODIMENTS

Embodiments of the invention can be used by a variety of computers and computerized devices. The types of client computers include laptop, desktop, and handheld computers such as personal digital assistants. Wireless phones and other consumer electronic devices could also be used as a source of input sentences. Server computers may include microcomputers with one or more processors, minicomputers, and mainframe computers. Networks could include fiber, WI-FI, and 3G, but are not limited to these networking technologies.

New sentences may be added to the central domain of sentences for a particular knowledge domain without the intervention of a knowledge engineer. For example, by automatically comparing the word tokens and detecting a difference through a string comparison algorithm.

Advantages

From the description above, a number of advantages of my method for updating semantic knowledge become evident:

(a) New semantic knowledge in a particular knowledge domain can be easily derived from users" sentences in a natural way during the process of creating their documents.

(b) Knowledge derived from multiple users over many locations will reflect a more complete and comprehensive view of the knowledge domain rather than being limited by the knowledge derived from a document corpus at single institution.

(c) Sentences can be placed in a local message queue and transmitted to the organization that maintains the semantic knowledge base at a convenient time when the client machine is connected to the computer network.

(d) The integrity and accuracy of the knowledge base can be maintained by knowledge engineers with specialized expertise in semantic knowledge representation, in distinction to requiring users update their own knowledge base.

(e) The use of computer networks for transmitting and receiving domain sentences and propositions permits a very rapid, timely, and low cost means to maintain a domain of sentences and their semantic knowledge.

(f) Users can receive updates of sentences and the knowledge given their own schedule and priorities.

Although the description above contains many specifics, these should not be construed as limiting the scope of the invention but as merely providing illustrations of some of the presently preferred embodiments. Thus the scope of the invention should be determined by the appended claims and their legal equivalents, rather than by the examples given.

The invention claimed is:

1. A method for updating a central knowledge domain of sentences, comprising:
    a. obtaining an input sentence through either written or spoken means in a specific knowledge domain from a client machine, and
    b. comparing said sentence to the sentences in a central knowledge domain and,
    c. if said sentence is not currently in said central knowledge domain, transmitting said sentence over a computer network to the source responsible for maintaining said central knowledge domain of sentences and,
    d. adding said sentence to said central knowledge domain of sentences.

2. The method according to claim 1 wherein an input sentence obtained through either written or spoken means that is not part of the central knowledge domain of sentences is associated with a display property that provides a visual indication that distinguishes it from normal text such as a different color, font, size, highlighting, label, or any combination.

3. The method according to claim 1 where the timing of comparison or transmission of sentences occurs based upon a user request.

4. The method according to claim 1 where the transmission of sentences occurs in response to a user configuring transmission to occur on a certain time schedule.

5. The method according to claim 1 where the timing of comparison or transmission of sentences is determined by a knowledge engineer.

6. A method for updating a central semantic knowledge base, comprising:
    a. obtaining an input sentence through either written or spoken means in a specific knowledge domain on a client machine, and
    b. comparing said sentence to a database of sentences in the knowledge domain and,
    c. if said sentence is not currently mapped to one or more proposition(s) in the semantic knowledge base, transmitting said sentence over a computer network to the source responsible for maintaining the semantic knowledge base and,
    d. adding proposition(s) that represent the semantic knowledge of said sentence to the central knowledge base as determined by a knowledge engineer.

7. The method according to claim 6 where the timing of comparison or transmission of propositions occurs based upon a user request.

8. The method according to claim 6 where the timing of comparison or transmission of propositions occurs in response to a user configuring transmission to occur on a certain time schedule.

9. A method for updating a local knowledge domain of sentences, comprising:
    a. requesting or pushing updated sentences from a machine holding the central knowledge domain of sentences and, b. transmitting said sentences over a computer network to a machine holding a local domain of sentences and, c. if said sentences are not currently in said local domain of sentences, adding said sentences to said local domain of sentences.

10. The method according to claim 9 where the timing of comparison or transmission of sentences occurs based upon a user request.

11. The method according to claim 9 where the transmission of sentences occurs in response to a user configuring said transmission to occur on a certain time schedule.

12. A method for updating a local semantic knowledge base, comprising:

a. requesting or pushing updated propositions from the machine holding the central semantic knowledge base and, b. transmitting said propositions over a computer network to a machine holding said local semantic knowledge base and, c. if said propositions are not currently in said local semantic knowledge base, adding said propositions to said local semantic knowledge base.

13. The method according to claim 12 where the timing of comparison or transmission of propositions occurs based upon a user request.

14. The method according to claim 12 where the timing of comparison or transmission of propositions occurs in response to a user configuring said comparison or said transmission to occur on a certain time schedule.

* * * * *